Nov. 17, 1925.  
C. C. REASONER  
1,562,364  
SELF LOADING CANE TRUCK  
Filed Oct. 5, 1922  
3 Sheets-Sheet 3
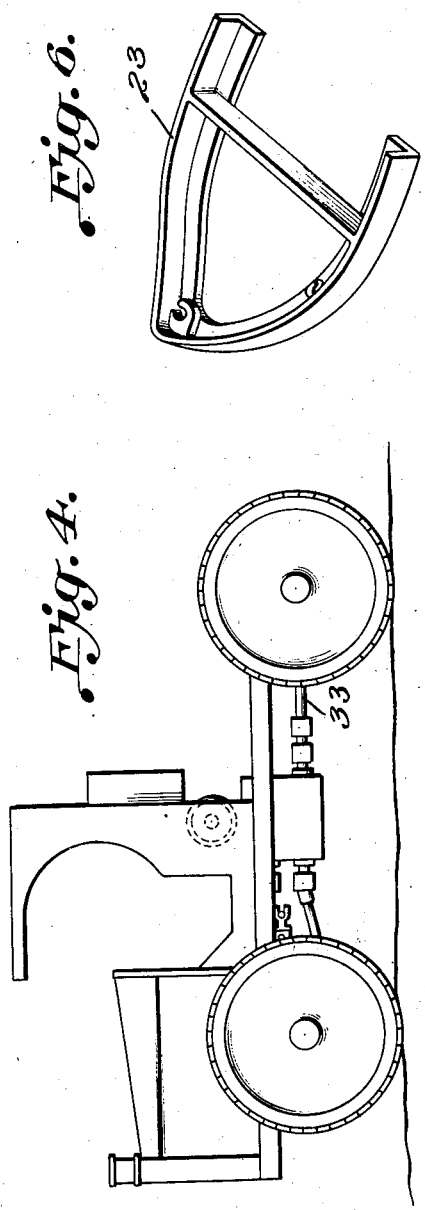
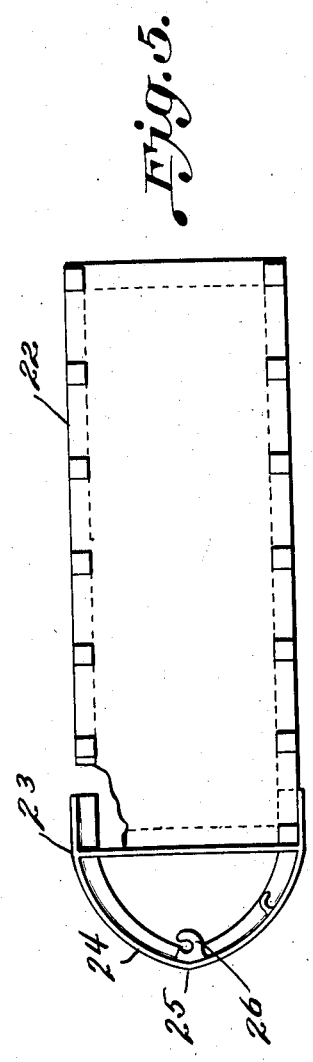
Inventor  
Claude C. Reasoner  
By  
Attorney Patented Nov. 17, 1925.

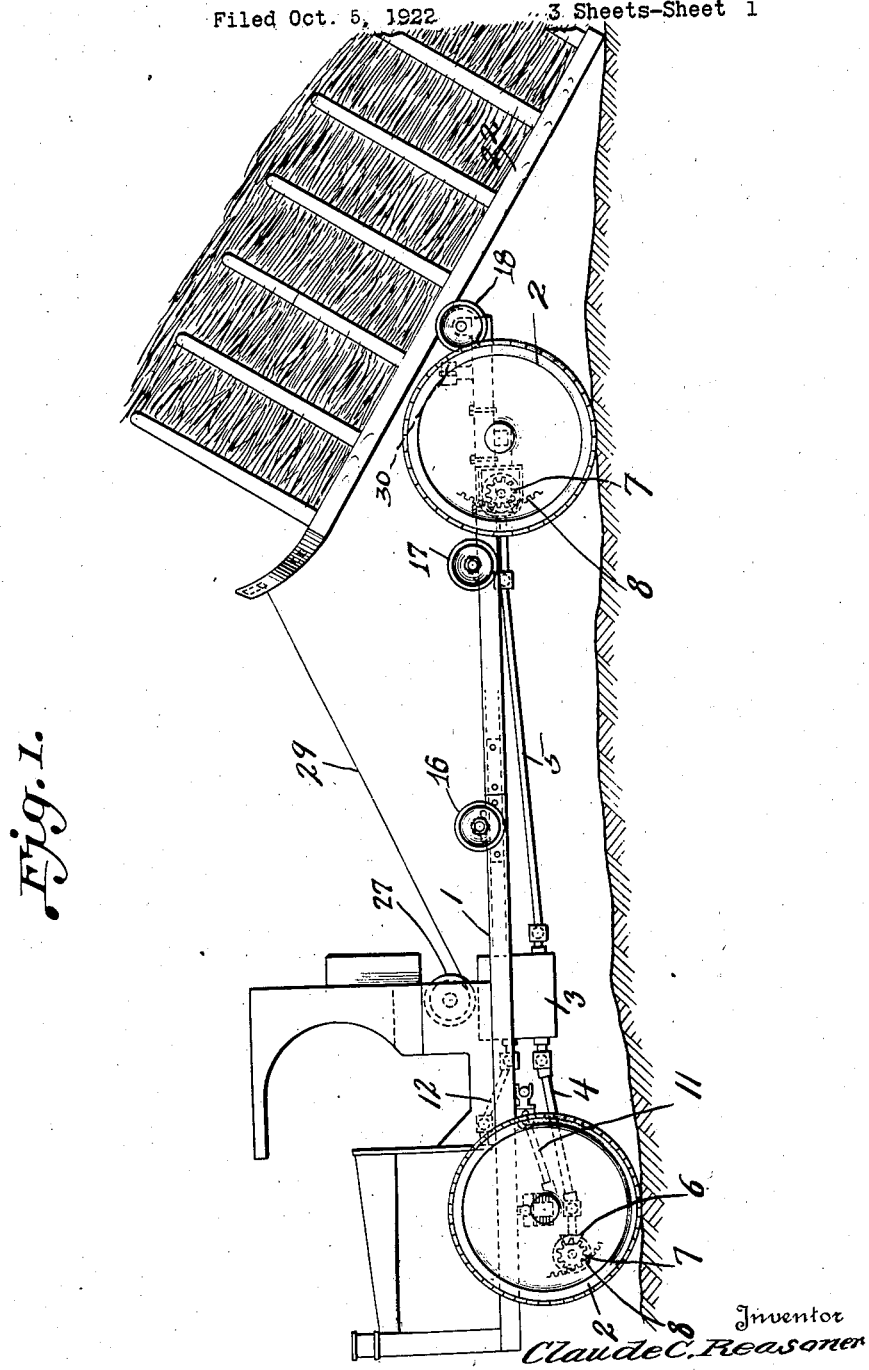

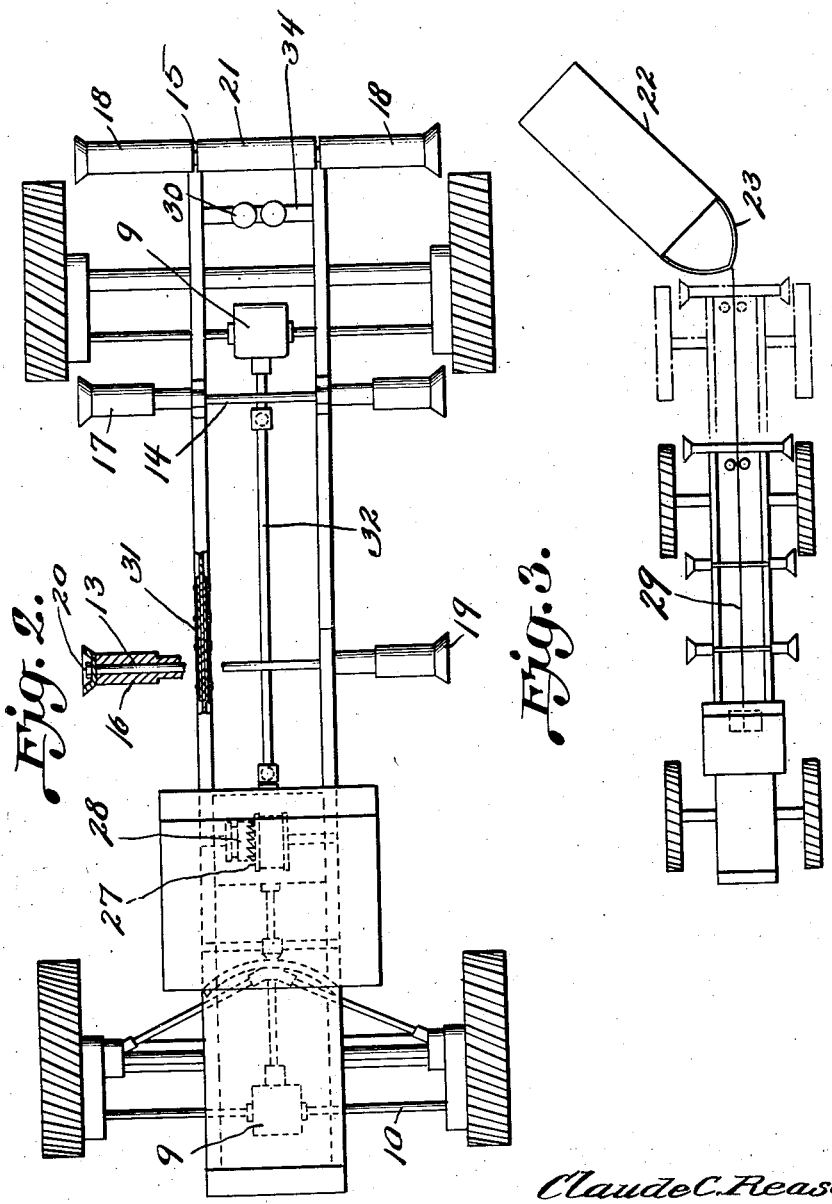

1,562,364

UNITED STATES PATENT OFFICE.

CLAUDE C. REASONER, OF HABANA, CUBA, ASSIGNOR TO CUBA SELF LOADING CANE TRUCK CORPORATION, OF NEW YORK, N. Y., A CORPORATION OF NEW YORK.

SELF-LOADING CANE TRUCK.

Application filed October 5, 1922. Serial No. 592,507.

*To all whom it may concern:*

Be it known that CLAUDE C. REASONER, a citizen of the United States, residing at Habana, Cuba, has invented new and useful Improvements in Self-Loading Cane Trucks, of which the following is a specification.

This invention relates to automotive vehicles of the truck type and proposes the construction of a vehicle which is especially designed for the transportation of sugar cane or the like from the field where it is harvested, being an improvement over the construction described and claimed in my Patent No. 1,250,505, granted December 18, 1917.

The invention further particularly relates to the construction of a power driven truck which is operated as a hauling unit in a system in which the truck is provided with a demountable body completely detachable from the chassis thereof to permit of its being deposited in one part of a field for loading while the truck proper is moved to another part of the field to pick up another body similar to the first which has in the meantime received its load.

The invention concerns itself chiefly with the solution of the problem of the successful carrying out of this system of hauling and distribution when conducted under conditions of heavy or mirey soils such as are commonly encountered in sugar growing districts, one of its objects being the provision of means whereby wide toleration in angular and distance approach is permissible in positioning the truck relative to the body to be picked up, another object being the minimizing of the power required to load the body on to the truck by avoiding altogether the dragging of the body over or through the soil, and direct elevation of the entire load thereof.

Another object of the invention is the construction of a truck which may be converted from a long wheel-base hauling truck to a short wheel base tractor.

With the above and other objects in view, my invention consists in the improved self loading cane truck illustrated in the accompanying drawings, described in the following specification, and particularly claimed, and in such variations and modifications thereof as will be obvious to those skilled in the art to which my invention relates.

In the drawings accompanying and forming a part of this specification and wherein the preferred embodiment of my invention is illustrated:

Figure 1 is a side elevation of my improved self loading truck showing the body in process of elevation.

Figure 2 is a plan view of the same, parts thereof being in section.

Figure 3 is a plan view of the truck, illustrating the mode of operation by which the truck moves toward the body prior to and during the elevating of the latter.

Figure 4 is a side elevation of the truck converted into a short-coupled tractor.

Figure 5 is a plan view of one of the truck bodies, parts being broken away.

Figure 6 is a perspective view of the metallic nose of said body.

Referring now in detail to the several figures, the numeral 1 represents the chassis frame of an automotive truck of the four wheel drive type, the wheels 2 being driven from the transmission 3 by means of forward and rear carden shafts 4 and 5 respectively. These shafts operate bevel gear mechanism which is indicated in Fig. 1 by the reference character 6, which mechanism transmits power through the front and rear differentials 9 to the jack shafts 10. These in turn rotate the spur gears 7, the latter meshing with internal gearing 8 which is secured to the driving wheels. The truck is also power steered through the carden shaft 11. The transmission 3 is connected with the internal combustion engine, not shown, by means of the universal shaft 12. The construction that has been described up to this point is conventional and is not to be understood as imposing any limitations upon the application or adaptability of my invention to use with any form of vehicle construction.

A plurality of shafts 13, 14 and 15 are secured transversely of the frame 1, the last mentioned of said shafts being located at the extreme rear of said frame and the others at an intermediate portion which is to be occupied by the body of the truck. Anti-friction rollers 16, 17 and 18 are journalled on the projecting ends of these shafts, the rollers on the rear shaft being formed longer than those on the other shafts for a purpose which will presently be described. Each of these rollers is formed with a beveled flange 19, the rollers being held upon said shafts by means of the nuts 20.

The rearmost shaft is also furnished with a central roller 21, which is freely mounted thereupon and intermediate the two end rollers 18.

The body of the truck may be of any suitable size or shape and is designed with a view to utilizing a standard chassis. A plurality of bodies is provided, one of which is shown in the drawings associated with the chassis, the usual procedure when operating the truck being to distribute the bodies at intervals through the field, to be filled with the harvested product, the truck then carrying away one body while the others are being filled. To accomplish this purpose the bodies are preferably made with longitudinal sill members 22, Figure 5, which are mounted in operative relation to a metallic nose 23, said bodies being constructed of any desired form or size. The metal nose 23 is rounded as shown at 24 to make a continuous curve which culminates in the apex 25. A hook 26 is provided on the metallic nose for the purpose of attaching a cable thereto.

The self loading truck is provided with a single hoisting drum 27 which is preferably located above the transmission 3 and is driven therefrom, the clutch 28 being associated therewith for the purpose of operating the hoist drum at will independently of the tractive driving mechanism. A single cable 29 is attached at one end to said drum and passes between the vertical guide rollers 30 which are secured to a transverse member 34, and over the rear roller 21.

In the operation of my improved self loading truck the bodies are distributed about the field as indicated above. The truck approaches a filled body and the driver of the truck backs the truck into proximity to the metallic nose 23 of the body. It is not necessary that the truck shall approach the body exactly in the direction of its length nor it is material how close to the body the truck stops. The truck and body may, for instance, be in the relative positions shown in full lines in Figure 3. The first act of the driver is to extend the cable 29 a sufficient distance to enable him to secure it to the hook 26. He then releases the engine clutch of his vehicle and operates the hoisting drum 27. When power is applied to the cable the truck moves rearwardly toward the body. The latter being heavily loaded and having a flat bottom devoid of wheels or rollers, and being presumably in heavy or mired ground presents enormous frictional resistance to movement, while the truck being a wheeled vehicle, furnished with anti-friction bearings and with the driving clutch disengaged will be readily susceptible to change in position so that when the cable is tensioned the vehicle moves back into a position in which the nose of the body stands vertically below the rearmost edge of the rear rollers. Much less power is required to bring the truck and body into juxta-position in the manner described than in prior constructions in which it was necessary to draw the body toward the truck.

When the truck has assumed the dotted line position with respect to the body, shown in Figure 3, further draft upon the cable will cause the nose of the body to be elevated until it rests in an inclined position adjacent the back edge of the roller 21 or either of the rollers 18. In this position the entire body is elevated from the ground with the exception of the back edge thereof which still bears a large share of the load and opposes a greater resistance to movement by the winding of the cable than does the truck which continues to move rearwardly beneath the body, further elevating the latter, until it reaches a position such as is shown in Figure 1 in which the body is almost balanced upon the rollers 18. If the body has been approached angularly, as shown at Figure 3, it will, upon reaching the position shown in Figure 1 lie against the flanged ends of one or both of the rear rollers 18 ready to be guided thereby into a position of parallelism with the longitudinal dimension of the truck as soon as the rear end of said body has been lifted from the ground. A slight additional pull on the cable 29 brings the body to the teetering point, elevating the rear end thereof, said body at once swinging into place, guided by the flanged rollers 18, the latter acting also as differential rollers, and moving in opposite directions, facilitating the turning of the loaded body. When the latter has assumed a longitudinal position the longitudinal sills thereof settle down upon the rollers 16 and 17 over which the body is drawn forward to its normal position upon the truck chassis. The central location of the vertical rollers 30 between which the cable passes, enables the handling of the body at a much greater angle to the longitudinal line of the truck than is possible in the device of my prior patent in which a pair of cables are used, one on each side of the chassis frame. It is apparent that a single cable passing between the rollers 30 may assume greater angularity with respect to the longitudinal dimension of the truck without coming into interference with the flanged ends of the rollers 18 than would be possible with a cable arranged more closely adjacent to said rollers. In addition, the use of a single cable centrally located does away with the need for a differential, which, as shown in my prior patent, was necessary in order to take up the slack of one of the pair of cables occasioned by the changing angularity of the body toward the truck in the process of elevation.

It will be noted that the chassis frame inclines downwardly toward the rear making the truck self unloading, the body traveling rearwardly by gravity to the dumping position shown in Figure 1, when the tension of the cable 29 is slackened. The truck then moves forwardly from under the body dropping the latter to the ground.

The chassis frame is preferably formed in two sections secured together in a bolted joint 31 shown in Figure 2. When the cane hauling season is at an end and it is no longer desired to operate the truck in the manner herein described the rear section of the chassis frame may be removed by unbolting at said joint and the axle may be taken from the rear section and secured to the forward section forming a short coupled four wheel drive tractor, as illustrated in Figure 4. This change also necessitates the substitution of a short shaft 33 for the long drive shaft 32 used in the full length truck.

I consider that my invention, resides primarily in the broad aspects hereinbefore set forth, and only secondarily in the details of construction and arrangement, wherefore I do not restrict myself to the particular construction here disclosed, but only by the terms of the claims and the state of the prior art.

Having described my invention what I claim as new and desire to secure by Letters Patent, is:—

1. In combination, a truck and a demountable body therefor, the latter being of such construction and load capacity as, when demounted and loaded, to exert greater frictional contact with the ground on which it rests than does the truck, said body converging at its forward end and adapted, when partially demounted, to rest with one end supported upon said truck and at an acute angle to the longitudinal dimension of the latter, means connecting said truck and body for shifting the center of support of said body upon said truck toward the center of mass of the former, and means supporting said body and operative when the latter reaches its teetering point to align said body longitudinally of the truck.

2. In combination, a truck having independently movable supporting means mounted thereon, a demountable body of such construction and load capacity as, when demounted and loaded, to exert greater frictional contact with the ground on which it rests than does the truck, said body converging at its forward end and adapted, when partially demounted, to rest with one end upon said truck and at an acute angle to the longitudinal dimension of the latter, means for connecting said truck and body for shifting the center of support of said body upon said truck toward the center of mass of said body, said independently movable supporting means being constructed when the body reaches its teetering point to guide said body into longitudinal alignment with the truck.

3. In combination, a truck having a series of guide rollers mounted on opposite sides thereof, a demountable body of such construction and load capacity as, when demounted and loaded, to exert greater frictional contact with the ground on which it rests than does said truck, said body having sills adapted to travel along said guide rollers, said body converging at its forward end and adapted, when partially demounted, to rest with one end upon said truck at an acute angle to the longitudinal dimension of the latter, means connecting said truck and body for shifting the center of support of said body upon said truck toward the center of mass of the body, the rollers at one end of said series being constructed to guide the body, when the latter reaches its teetering point, to align the sills of said body longitudinally of said truck.

4. In combination, a truck, a row of independently movable rollers mounted transversely adjacent the rear end thereof, the outside rollers being flanged at their outer ends, a demountable body having sills adapted to travel along said rollers, said body being of such construction and load capacity as, when demounted and loaded, to exert greater frictional contact with the ground on which it rests than does the truck, said body converging at its forward end and adapted when partially demounted to rest with one end upon said truck at an acute angle to the longitudinal dimension thereof, means connecting said truck and body for shifting the center of support toward the center of mass of said body, the flanges of the rollers being adapted to engage said sills, and operative when the body reaches its teetering point to align said sills longitudinally of said truck, said rollers being frictionally movable with the movements of said body.

5. In combination, a truck, a row of rollers mounted transversely adjacent the rear end thereof, the outside rollers being flanged at their outer ends, a demountable body having sills adapted to travel along said rollers, said body being of such construction and load capacity as, when demounted and loaded, to exert greater frictional contact with the ground on which it rests than does the truck, said body converging at its forward end and adapted when partially demounted to rest with one end upon said truck at an acute angle to the longitudinal dimension thereof, means connecting said truck and body, and actuated by said truck for shifting the center of support toward the center of mass of said body, the flanges of the rows being adapted to engage said sills, and operative when the body reaches its teetering point to align said sills longitudinally of said truck, said rollers being frictionally movable with the movements of said body.

6. In combination, a truck, a row of rollers mounted transversely adjacent the rear end thereof, the outside rollers being flanged at their outer ends, a demountable body having sills adapted to travel along said rollers, said body being of such construction and load capacity as, when demounted and loaded, to exert greater frictional contact with the ground on which it rests than does the truck, said body converging at its forward end and adapted when partially demounted to rest with one end upon said truck at an acute angle to the longitudinal dimension thereof, a drum on said truck, means for operating said drum, a flexible connection between said truck and body for shifting the center of support toward the center of mass of said body, the rollers being adapted to engage the sills, and operative when the body reaches its teetering point to align said sills longitudinally of said truck, the latter being frictionally movable with the movements of said body.

7. In combination, a truck and a demountable body therefor, said body having a ground-engaging surface of greater frictional characteristic than the tractive parts of said truck, said body converging at its forward end and adapted to rest with one end supported upon said truck and at an acute angle to the longitudinal dimension thereof, means connecting said vehicle and body when the latter is partially demounted, said means being operative to draw said truck to a position beneath said body, and means on said truck for aligning said body with said truck.

In testimony whereof I affix my signature.

CLAUDE C. REASONER.